United States Patent [19]

Arya

[11] 4,068,692
[45] Jan. 17, 1978

[54] FUEL ELEMENT LOADING SYSTEM

[75] Inventor: Satya Prakash Arya, San Diego, Calif.

[73] Assignee: General Atomic Company, San Diego, Calif.

[21] Appl. No.: 603,531

[22] Filed: Aug. 11, 1975

[51] Int. Cl.² ............................................. B65B 1/08
[52] U.S. Cl. .................................................. 141/392
[58] Field of Search ..................... 141/67, 71, 72, 100, 141/103, 104, 105, 238, 244, 247, 249, 311, 325, 367, 391, 392, 237, 242, 243, 235, 106, 364–366; 222/429; 214/18 N

[56] References Cited

U.S. PATENT DOCUMENTS

| | | | |
|---|---|---|---|
| 2,985,341 | 5/1961 | Howell | 141/244 X |
| 3,223,490 | 12/1965 | Sacken et al. | 141/237 X |
| 3,788,370 | 1/1974 | Hare et al. | 141/238 X |
| 3,913,806 | 10/1975 | Red | 222/429 |

Primary Examiner—Richard E. Aegerter
Assistant Examiner—Frederick R. Schmidt
Attorney, Agent, or Firm—Fitch, Even, Tabin & Luedeka

[57] ABSTRACT

A nuclear fuel element loading system is described which conveys a plurality of fuel rods to longitudinal passages in fuel elements. Conveyor means successively position the fuel rods above the longitudinal passages in axial alignment therewith and adapter means guide the fuel rods from the conveyor means into the longitudinal passages. The fuel elements are vibrated to cause the fuel rods to fall into the longitudinal passages through the adapter means.

8 Claims, 3 Drawing Figures

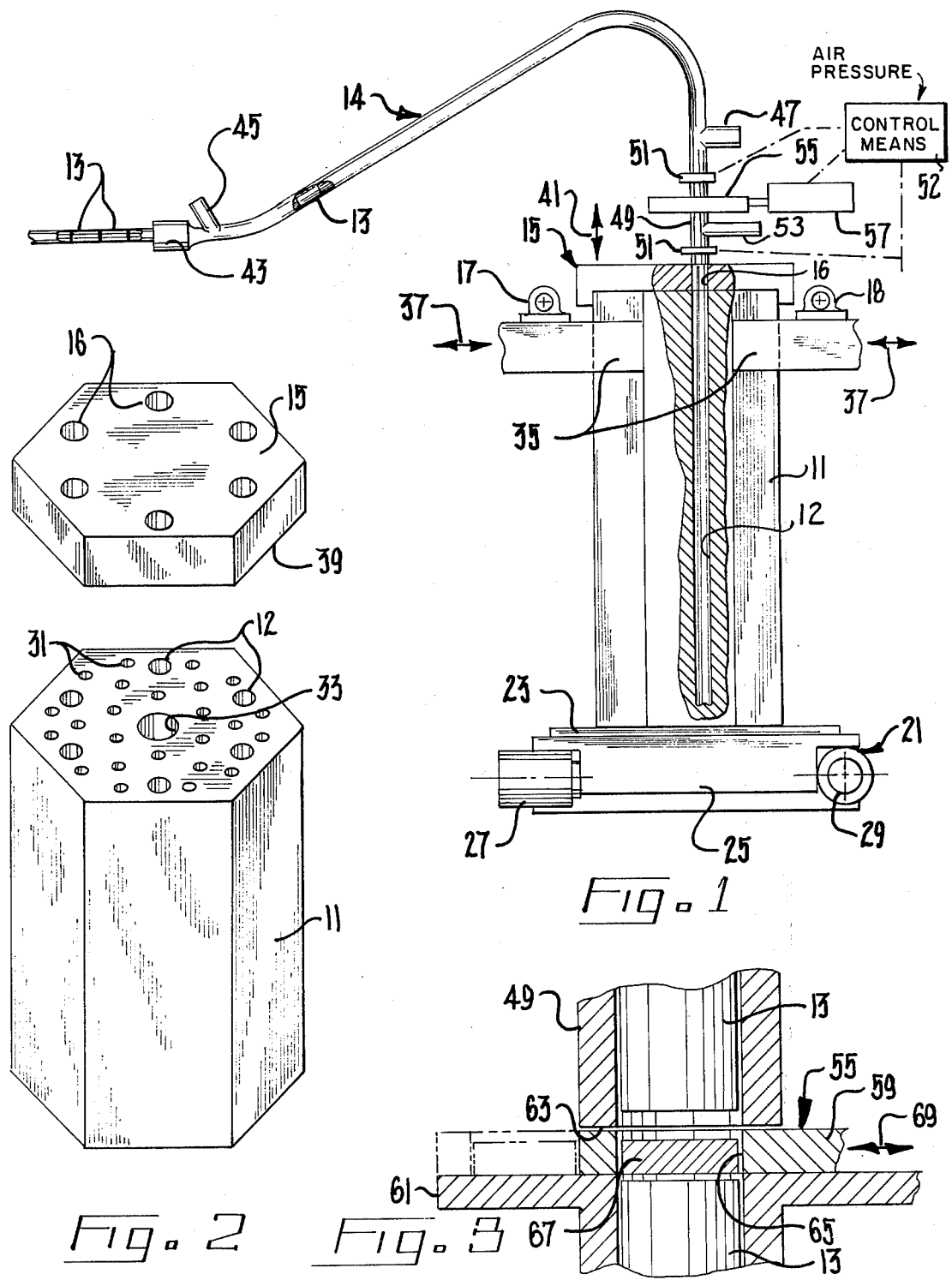

4,068,692

FUEL ELEMENT LOADING SYSTEM

This invention relates generally to systems for loading fuel rods in nuclear fuel elements for use in nuclear reactors. More particularly, the invention relates to a nuclear fuel element loading system which is relatively low in cost and simple of operation and construction.

Nuclear reactors, particularly those of the gas-cooled type, may employ fuel rods of fissionable material supported in a plurality of fuel elements such that coolant flows along the axial direction of the rods. In one particularly advantageous construction, the reactor core is made up of a plurality of columns of separate fuel elements or blocks. The fuel blocks may be of pressed graphite construction and contain a plurality of blind holes, the lower ends of which are closed and the upper ends of which are open. A plurality of fuel rods are inserted into each of the longitudinal holes. Each of the fuel elements is also provided with a plurality of openings which align to form vertical passages which extend completely through the fuel blocks. These vertical passages are utilized to pass coolant gas through the reactor core. The fuel blocks also may be provided with aligned passages useful for the insertion of control rods and grappling devices for raising and lowering the fuel elements in refueling operations.

Due to hazardous radiation, it is necessary to load the fuel rods into the fuel blocks by automated means in a radiation shielded environment. A number of schemes have been devised for accomplishing this which have typically involved relatively expensive and complex precision apparatus. Location tolerances of the fuel holes or longitudinal passages in the fuel blocks result in a variation of the fuel holes from their nominal position. Prior art apparatus has typically necessitated the determination of the actual location of the fuel holes and their deviation from the nominal location, and then precise positioning of the loading mechanism accurately over the holes. Equipment for accomplishing such accurate locating and which is commercially available employs automated servo drives. The information determined by operation of such equipment must then be transferred to other equipment, such as a precision $x$-$y$ table with high accuracy and repeatability, to position the fuel rod loading mechanism precisely over the fuel holes.

It is an object of the present invention to provide an improved nuclear fuel element loading system.

Another object of the invention is to provide a nuclear fuel element loading system which eliminates the need for a determination of the actual location of the fuel holes.

A further object of the invention is to provide a nuclear fuel element loading system which eliminates the need for loading head positioning equipment of high precision quality.

A still further object of the invention is to provide a nuclear fuel element loading system which may be readily automated and is simple of construction.

Other objects of the invention will become apparent to those skilled in the art from the following description, taken in connection with the accompanying drawings wherein:

FIG. 1 is a schematic side view, partially in section, of a nuclear fuel element loading system constructed in accordance with the invention;

FIG. 2 is an exploded view illustrating a nuclear fuel element and a portion of the system of FIG. 1; and FIG. 3 is an enlarged schematic view, in section, of a portion of the apparatus of FIG. 3.

Very generally, the nuclear fuel element loading system of the invention is for the purpose of loading a fuel element 11 having a plurality of longitudinal passages 12 therein, each for receiving a plurality of fuel rods 13 in axial alignment therein. The system includes conveyor means 14 for conveying the fuel rods in succession into axial alignment with and above the longitudinal passages. Adapter means 15 guide the fuel rods from the conveyor means into the longitudinal passages. The adapter means define a transfer passage 16 having a size which is larger than the size of the corresponding longitudinal passage by an amount sufficient that the entrance to the longitudinal passage is within the perimeter of the transfer passage for maximum misalignment due to dimensional variations within tolerances. Vibrator means 17 and 18 vibrate the fuel elements to cause the fuel rods to fall into the longitudinal passages.

Referring now more particularly to the drawings, the fuel element or fuel block 11 is shown positioned vertically supported on a positioning table 21. The positioning table 21 may be of any suitable construction. As illustrated, it includes an upper platform 23 positioned on a housing 25. The housing 25 is, in turn, positioned on rollers 27 for providing translational movement in a first direction (the $x$ direction) and rollers 29 for providing translational motion in a direction perpendicular to the first direction (the $y$ direction). The axes of rotation of the rollers 27 are perpendicular to the axes of rotation of the rollers 29. Positioning tables of this general type are known in the art and may be controlled to move to a series of pre-programmed positions by a tape control device.

As may be seen in FIG. 2, the particular fuel element illustrated is a block of hexagonal cross section. The block is comprised of pressed graphite in which the longitudinal passages or holes 12 for receiving the fuel rods extend axially, parallel with the flats of the hexagon. The holes 12 are blind, that is, terminate a short distance above the bottom surface of the block 11, thereby providing receptacles in which the fuel rods are contained.

In addition to the holes 12, the block 11 is provided with a plurality of longitudinal passages 31 which pass through the block parallel with the holes 12 and which extend completely through the block. When a number of the blocks 11 are assembled into a core, the passages 31 in adjacent blocks align with each other to provide longitudinal passages for the flow of coolant through the core.

In addition to the passages 31, a central passage 33 is provided in the core block 11 for the purpose of receiving a control rod for regulating the neutron flux in the core. The control rod passages 33 of adjacent blocks also align as did the passages 31 and pass completely through the blocks. The internal configuration of the passages 33 may also be such as to facilitate the insertion of a grappling device for raising and lowering the fuel blocks 11 during core loading and refueling.

Returning now to FIG. 1, the core blocks are retained and secured in position on the $x$-$y$ table or positioning table 21 by clamping means comprising a pair of retractable jaws 35. The jaws 35 are mounted on the positioning table 21 by suitable means, not shown, and are movable in the direction of the arrows 37 from a spread apart condition in which the fuel block 11 may be removed to the illustrated position in which the fuel block 11 is clamped securely on the positioning table.

The adapter means 15 comprise an adapted plate having a flange 39 which extends downwardly and conforms with the outer periphery of the upper edge of the block 11. The flange 39 thus locates the plate 15 on the upper surface of the fuel element 11. Suitable means, not shown, are provided for moving the adapter plate 15 reciprocally perpendicular to the plane of the plate as indicated by the double arrow 41.

As may be seen more clearly in FIG. 2, the adapter plate 15 is provided with a plurality of holes or passages 16 therein which register generally with the positions of the longitudinal passages 12 in the fuel element block 11. Each of these holes or transfer passages 16 is of a size which is larger than the size of the corresponding longitudinal passage by an amount sufficient that the entrance to the longitudinal passage is within the perimeter of the transfer passage for maximum misalignment due to dimensional variations within tolerances. For example, where manufacturing tolerance on the fuel hole location is plus or minus 0.010 inch (0.025 centimeter) from nominal center position, the diameter of the adapter plate passages 16 may be made larger in diameter than the longitudinal passages 12 by about 0.040 inch (0.102 centimeter). The larger diameter in the passages 16 therefore ensures that the full circle of every fuel hole in the fuel element is enclosed within its respective hole in the adapter plate. Preferably, the diameter of the transfer passage 16 does not exceed about six percent of the diameter of the corresponding fuel hole 12 so that the fuel rods may be caused to enter the fuel holes by vibrations as described below.

Referring now in particular to FIG. 1, the fuel rods 13 are supplied to the apparatus of the invention from a suitable fuel rod stacking machine, not shown, such machines being known in the art. Each fuel rod is supplied one at a time, to a gate 43 which admits only one fuel rod at a time successively to the conveyor means 14. The conveyor means 14 comprise a conveyor tube having an internal diameter just sufficient to allow passage of the fuel rods 13.

Once a fuel rod has entered the conveyor tube 14, a pulse of pressurized air is supplied to the conveyor tube from a pressurized air inlet 45. The pressurized pulse is sufficient to raise the single fuel rod in the tube up through the arch formed by the tube and visible in FIG. 1. This arch may, for example, be at a height approximately 36 inches (91.44 centimeters) above the upper surface of the fuel block 11. An outlet 47 is provided in the tube just below the arcuate portion for relieving the pressure of the pulse once the fuel rod passes that point. The air outlet is located just above the vertical section 49 of the conveyor tube 14.

The vertical section 49 of the conveyor tube 14 is provided with a pair of pinch valves 51. The pinch valves are spaced longitudinally along the vertical section 49 and are operated by suitable pneumatic means 52. Each pinch valve (not illustrated in detail) comprises a flexible tube coaxial with the vertical section 49 and surrounded by an annulus. Compressed air injected into the annulus forces the wall of the flexible tube inwardly to engage and hold a fuel rod. Each of the pinch valves 51 is independently controlled by suitable control means 52, and the valves are operated to allow the incoming fuel rods to rest in the vertical section 49 spaced apart to allow insertion of a spacer as will be explained. The section 49 is aligned with the passage 16 registering with the particular fuel hole 12 being filled. The lowermost one of the pinch valves 51 opens to drop the lowermost one of the fuel rods through the passage 16 and into the fuel hole 12.

As a fuel rod drops into the passage 16, misalignment of the passage 16 and the fuel hole 12, and/or misalignment of the fuel rod with the fuel hole 12 may result in the fuel rod stopping on the lip formed within the passage 16 by the upper surface of the fuel element block 11. In order to ensure that the fuel rod will drop into the fuel hole 12 and fall therethrough as far as possible by gravity, the vibrator means 17 and 18 are provided. The vibrator means include a vibrator device 17 mounted on one of the jaws 35 and a vibrator device 18 mounted on the other of the jaws 35. The vibrator devices 17 and 18 may be of any suitable type, such as pneumatic vibrators, and are aligned and adapted to provide a combination of horizontal and vertical vibrations which is transferred to the fuel element block 11 and the adapter plate 15. These vibrations are preferably of low amplitude and low frequency to cause the misaligned fuel rods to spin and translate back and forth over the fuel hole or longitudinal passage 12 at a fairly rapid rate. The back and forth translatory motion and the spin allow the fuel rod to find and drop into the longitudinal passage 12. Moreover, the vibrations within the fuel block 11 help the air trapped between the fuel rod and the bottom of the longitudinal passage 12 to escape rapidly from the hole. This allows the rods to travel down the holes at a faster rate. Also, any irregularities and roughness in the fuel hole which would normally tend to bind the fuel rods have less tendency to do so as a result of the vibrations.

It has been found that for satisfactory results, horizontal and vertical vibrations of an amplitude of 0.001 inch (0.002 centimeter) at a frequency of about 100 cycles per second operate satisfactorily. Under such conditions, the apparatus of the invention is capable of loading fuel rods at a rate of approximately 3600 rods per hour. After each fuel hole 12 is filled, the table 23 is moved to cause the tube 49 to register with a different one of the passages 16 in the adapter plate 15.

During transportation of the fuel rods through the conveyor means 14, some dust or small chips may be generated and carried by the pressure pulse along with the rods. This material may be removed from the conveyor tube by the provision of an air outlet passage 53 just prior to the lower terminus of the vertical section 49. An air moving vacuum source and suitable filter arrangement is connected to the tube 53.

For reasons relating to expansion of fuel rods during curing of the fuel elements, it may be desirable to introduce spacers between alternate fuel rods. To this end, the spacer insertion mechansim 55 is employed. The mechanism 55 is located between the upper and lower pinch valves 51 and is operated by a pneumatic cylinder 57.

Referring more particularly to FIG. 3, the mechanism 55 includes a plate 59 slidable on a flange 61 at a gap 63 in the tube 49. The plate 59 is provided with an opening 65 in which a spacer element 67 is received. The plate 59 is movable reciprocally in the directions of the double arrow 69 between the position shown in phantom and the position shown in solid. In the solid position, pinch valves 51 are operated so as to drop an assembly of one spacer sandwiched between two fuel rods through the passage 16 and into the fuel hole 12. In the phantom position a new spacer is dropped into the opening 65 from a suitable feeder mechanism, not shown.

It may be seen, therefore, that the system of the invention eliminates any need for a preliminary inspection machine to determine the actual location of the fuel holes 12. Moreover, the precision of the positioning table 21 need not be of high quality. The device of the invention is readily automated and simple of construction. Due to the vibrations, the fuel rods find the fuel holes themselves, and are assisted in their travel down the holes, thereby eliminating any need for a ram to force the rods into the holes. If desired, a plurality of conveyor tubes 14 may be utilized, one in each of the passages 16 in an adapter plate 15. Thus, all of the fuel holes 12 in a given fuel element fuel block 11 may be filled simultaneously.

Various modifications of the invention in addition to those shown and described herein will become apparent to those skilled in the art from the foregoing description and accompanying drawings. Such modifications are intended to fall within the scope of the appended claims.

What is claimed is:

1. A nuclear fuel element loading system in combination with a fuel element having a plurality of longitudinal passages, each for receiving a plurality of fuel rods aligned axially therein, said system comprising, conveyor means for conveying fuel rods in succession into a tube disposed in axial alignment with and above the longitudinal passages, adapter means for guiding the fuel rods from said tube into the longitudinal passages, said adapter means defining a transfer passage extending from said tube to a longitudinal passage, said axially aligned tube including a section having two pinch valve means which are vertically spaced apart and insertion means for inserting a spacer element located between said two pinch valve means, means for operating said two pinch valve means and said insertion means to assemble two fuel rods in said tube section with a spacer element therebetween and to release the fuel rods to allow said released fuel rods and spacer element to fall together as a three-member group toward the fuel element, said transfer passage having a cross-sectional size which is larger than the cross-sectional size of the corresponding longitudinal passage by an amount sufficient that the entrance to the longitudinal passage is within the perimeter of said transfer passage for maximum misalignment due to dimensional variations within tolerances, and vibrator means for vibrating the fuel elements to cause the fuel rods to fall into the longitudinal passages, said vibrator means being adapted to impart both horizontal and vertical components of oscillation to the fuel elements.

2. A nuclear fuel element loading system according to claim 1 wherein the diameter of said transfer passage does not exceed about six percent of the diameter of the corresponding longitudinal passage.

3. A nuclear fuel element loading system according to claim 1 wherein said conveyor means comprise a single conveyor tube, and wherein said system further includes supporting means for the fuel element adapted for positioning the longitudinal passages in the fuel element successively under said conveyor tube.

4. A nuclear fuel element loading system according to claim 1 including clamping means for securing the fuel element in position.

5. A nuclear fuel element loading system according to claim 4 wherein said vibrator means are secured to said clamping means.

6. A nuclear fuel element loading system according to claim 1 wherein said adapter means comprise a plate.

7. A nuclear fuel element loading system according to claim 1 wherein said insertion means include a slidable plate movable transversely of said conveyor means and having an opening therein for receiving spacer elements.

8. A nuclear fuel element loading system in combination with a fuel element having a plurality of longitudinal passages, each for receiving a plurality of fuel rods aligned axially therein, said system comprising conveyor means for conveying fuel rods in succession to a tube section in axial alignment with and above the longitudinal passages, said tube section including two pinch valve means which are vertically spaced apart and insertion means for inserting a spacer element located between said two pinch valve means, means for operating said two pinch valve means and said insertion means to assemble two fuel rods in said tube section with a spacer element therebetween and to release the held fuel rods to allow said released fuel rods and spacer element to fall together as a three-member group toward the fuel element, an adapter plate defining a plurality of transfer passages extending from said tube section to a corresponding longitudinal passage in said fuel element, said transfer passages having a size larger than the size of the corresponding longitudinal passages by an amount sufficient that the entrances to the longitudinal passages are within the perimeters of said transfer passages for maximum misalignment due to dimensional variations within tolerances, clamping means for securing the fuel elements in position, and vibrator means mounted on said clamping means for vibrating the fuel elements to cause the fuel rods to fall into the longitudinal passages, said vibrator means being adapted to impart both horizontal and vertical components of oscillation to the fuel elements.

* * * * *